(12) United States Patent
Hu

(10) Patent No.: US 8,052,102 B2
(45) Date of Patent: Nov. 8, 2011

(54) FOLDABLE SUPPORTING STAND WITH STOPPERS IN TWO DIRECTIONS

(75) Inventor: Chung-Cheng Hu, Jhonghe (TW)

(73) Assignee: Syncmold Enterprise Corp., Taipei County (TW)

( * ) Notice: Subject to any disclaimer, the term of this patent is extended or adjusted under 35 U.S.C. 154(b) by 381 days.

(21) Appl. No.: 12/320,301

(22) Filed: Jan. 23, 2009

(65) Prior Publication Data
US 2010/0187374 A1    Jul. 29, 2010

(51) Int. Cl.
*F16M 11/00* (2006.01)
(52) U.S. Cl. .................. 248/157; 248/917; 248/919
(58) Field of Classification Search .................. 248/157, 248/917, 919–922, 923; 361/679.21
See application file for complete search history.

(56) References Cited

U.S. PATENT DOCUMENTS

| | | | | |
|---|---|---|---|---|
| 7,431,254 B2 * | 10/2008 | Cheng | ...................... | 248/292.12 |
| 7,490,796 B2 * | 2/2009 | Kim | ............................... | 248/157 |
| 7,497,408 B2 * | 3/2009 | Lim et al. | ................... | 248/284.1 |
| 7,775,487 B2 * | 8/2010 | Hu | ................. | 248/157 |
| 7,775,494 B2 * | 8/2010 | Yen et al. | ................... | 248/284.1 |

* cited by examiner

*Primary Examiner* — Gwendolyn W Baxter
(74) *Attorney, Agent, or Firm* — Rosenberg, Klein & Lee

(57) ABSTRACT

A foldable supporting stand with stoppers in two directions includes a base, a support, a sliding body, a positioning means, a first swinging piece and a second swinging piece. The support is rotatably connected to the base. The sliding body is slidably provided on the support and is further connected to a screen. The first swinging piece and the second swinging piece are swingably connected to the positioning means. The positioning means is connected on the support. When the support is folded on the base, the first swinging piece and the second swinging piece are subjected to their gravitational forces to swing toward the sliding body and thus lock the sliding body. The locked sliding body is restricted from sliding on the support in two directions.

9 Claims, 9 Drawing Sheets

FOLDABLE SUPPORTING STAND WITH STOPPERS IN TWO DIRECTIONS

BACKGROUND OF THE INVENTION

1. Field of the Invention

The present invention relates to a supporting stand, and in particular to a foldable supporting stand with stoppers in two directions.

2. Description of Related Art

Current display screens are generally connected to a supporting stand, whereby the display screen can be watched by a user in an upright position. Since the supporting stand is configured such that it is able to ascend or descend, the user can adjust the height of the display screen freely according to his/her demands. Please refer to FIG. 1, which shows a supporting stand for a display with the possibility of height adjustment. The supporting stand for a display includes a base 1a, a support 2a connected to the base 1a, and a positioning element 3a. The support 2a has a first connecting portion 21a and a second connecting portion 22a. The first connecting portion 21a is provided with a positioning hole 211a, and the second connecting portion 22a is provided with a plurality of fixing holes 221a that are arranged at identical intervals. The first connecting portion 21a movably covers the second connecting portion 22a. One end of the first connecting portion 21a is further connected to a display screen 4a, and one end of the second connecting portion 22a is connected to the base 1a. The positioning element 3a is a pin. According to the desired height, the user selectively inserts the positioning element 3a into the positioning hole 211a and the fixing holes 221a, thereby fixing the first connecting portion 21a and allowing the display screen 4a to ascend or descend.

However, when the user intends to store the supporting stand 2a and the display screen 4a, the user has to fold the supporting stand 2a first, and then insert the positioning element 3a into the positioning hole 211a and the fixing holes 221a so as to fix the display screen 4a (FIG. 2). If the user forgets to insert the positioning element 3a into the positioning hole 211a and the fixing holes 221a, the display screen 4a will move on the supporting stand 2a freely, which may not only increase the volume for package but also increase the possibility of making the display screen 4a suffer damage in transportation.

Therefore, the above supporting stand has some drawbacks as follows:

(I) Since the user has to manually insert the positioning element 3a into the positioning hole 211a and the fixing holes 221a so as to fix the display screen 4a, it is not convenient in use.

(II) Due to the positioning element 3a, a protrusion is formed on the surface of the supporting stand 2a, which affects the aesthetic feeling of the whole supporting stand 2a.

(III) The positioning element 3a is used to provide a fixing effect. However, in order to allow a relative movement between the first connecting portion 21a and the second connecting portion 22a, a suitable gap should be maintained therebetween. As a result, the first connecting portion 21a may shake or swing when it moves. After being used for many times, the first connecting portion may suffer damage.

(IV) When the user intends to store the supporting stand 2a and the display screen 4a, the user has to fold the supporting stand 2a first, and then insert the positioning element 3a into the positioning hole 211a and the fixing holes 221a so as to fix the display screen 4a (FIG. 2). If the positioning element 3a is not completely inserted into the proper position, the display screen 4a may suffer damage during transportation.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a foldable supporting stand with stoppers in two directions, whereby the user can fold and store the supporting stand conveniently and the volume for package can be reduced.

In order to achieve the above objects, the present invention provides a foldable supporting stand with stoppers in two directions. Via its gravitational force, the internal structure of the supporting stand can be driven to fix a screen on the supporting stand. Via this arrangement, the screen can be avoided from moving and being hit, so that the possibility of making the screen to suffer damage can be reduced.

In order to achieve the above objects, the present invention further provides a foldable supporting stand with stoppers in two directions, which includes a base; a support rotatably connected to the base; a sliding body slidingly disposed on the support, one side of the sliding body being provided with a first stopper and the other side thereof being provided with a second stopper; a positioning means located between the sliding body and the support, the positioning means being connected in the support; a first swinging piece swingably connected to the positioning means; and a second swinging piece swingably connected to the positioning means, the second swinging piece being longer than the first swinging piece, wherein when the support is folded toward the base, the first swinging piece and the second swinging piece together swing from the positioning means toward the sliding body. The longer second swinging piece will first abut the sliding body and lock the second stopper. Then, the first swinging piece abuts the sliding body and locks the first stopper. In this way, the sliding body can be restricted from sliding in two directions.

The present invention has advantageous features as follows:

(I) In the foldable supporting stand with stoppers in two directions according to the present invention, via its gravitational force, the first swinging piece and the second swinging piece can swing and lock the sliding body, thereby restricting the sliding body from moving in two directions.

(II) When packaging, the foldable supporting stand with stoppers in two directions can fix the screen and prevent the screen from moving, so that the screen can be protected from moving and suffering damage in transportation.

(III) In the foldable supporting stand with stoppers in two directions according to the present invention, via a simple structure, its gravitational force is used as a driving force to restrict the movement of the screen. Thus, the production cost is less.

(IV) Via the foldable supporting stand with stoppers in two directions of the present invention, the volume when packaged can be significantly reduced, which not only saves the cost for packaging material but also increases the number of stands in a means of transport.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
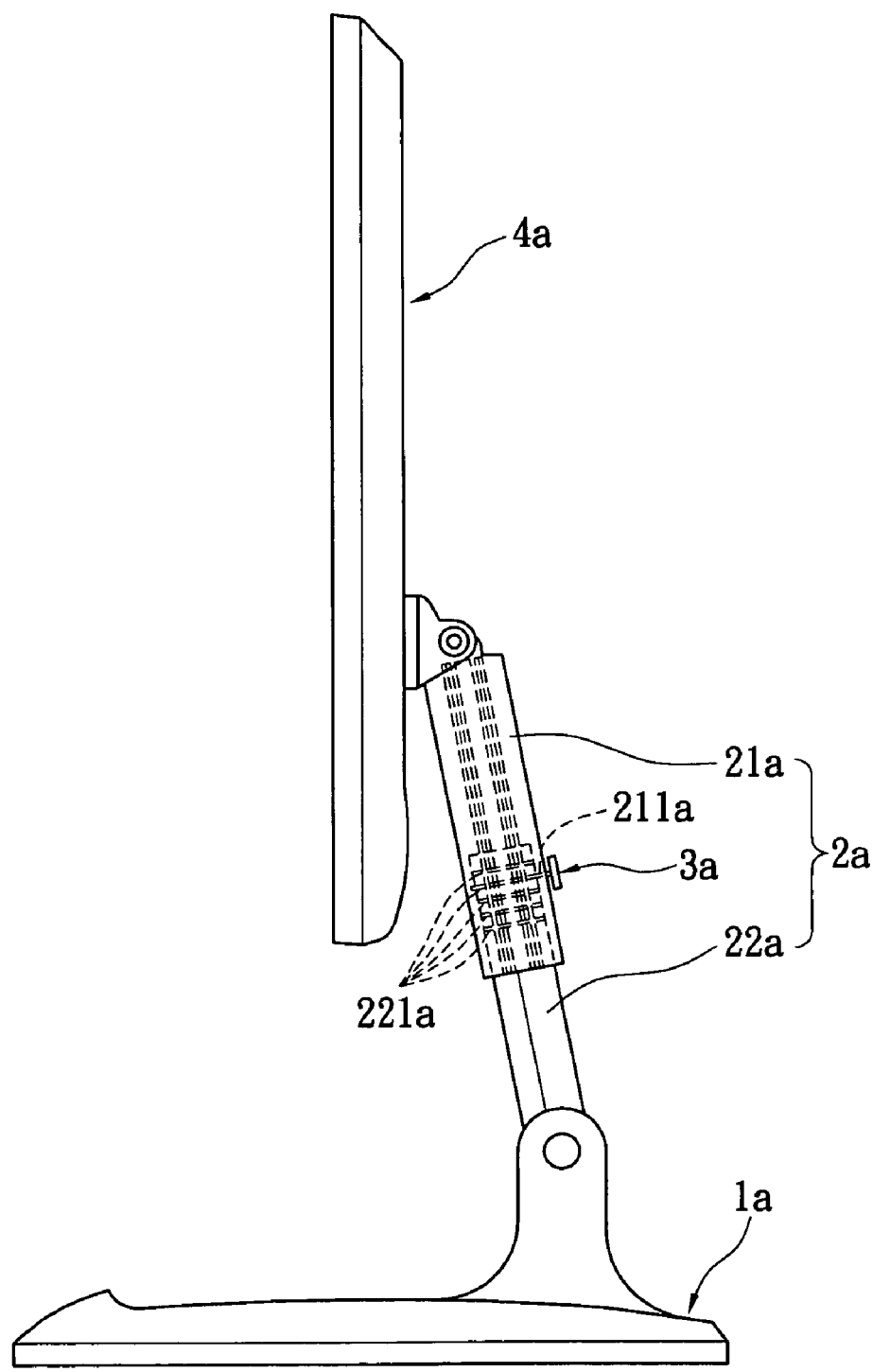
FIG. 1 is a schematic view showing a conventional supporting stand.
Figure 2:
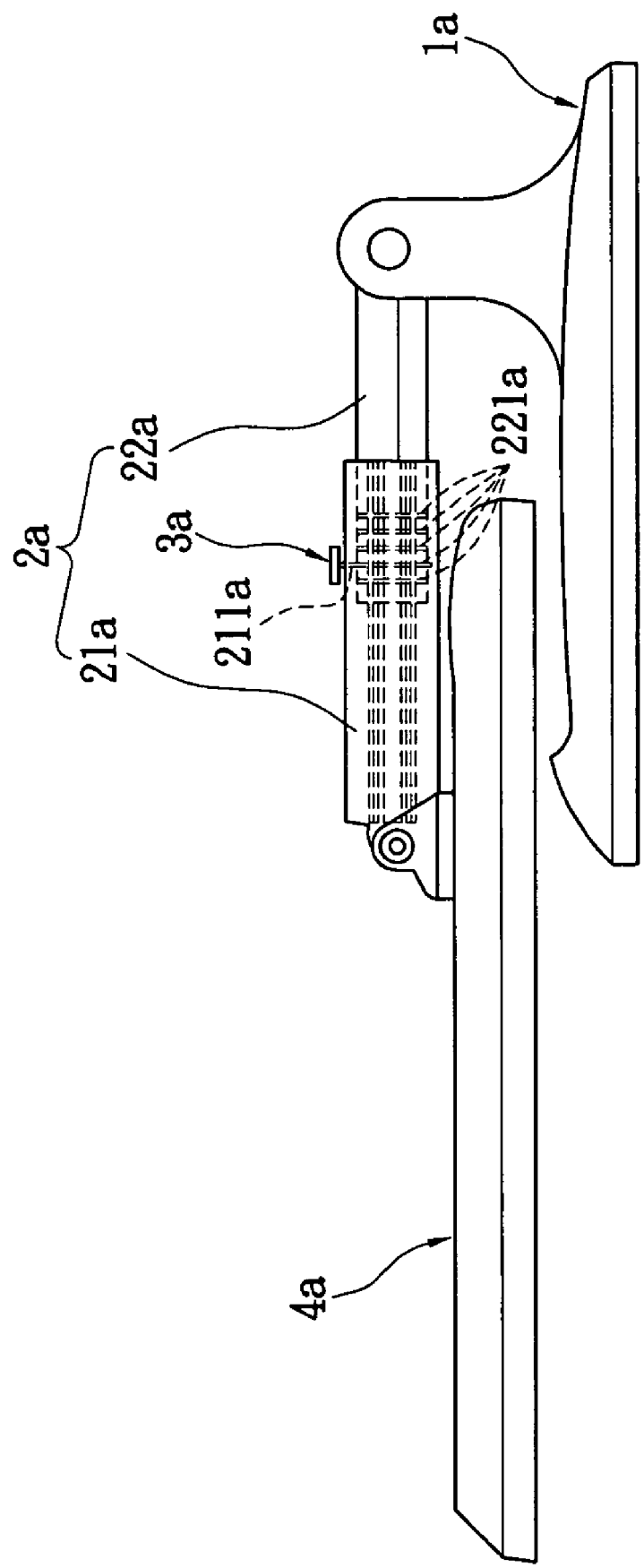
FIG. 2 is a schematic view showing the folded state of a conventional supporting stand.
Figure 3:
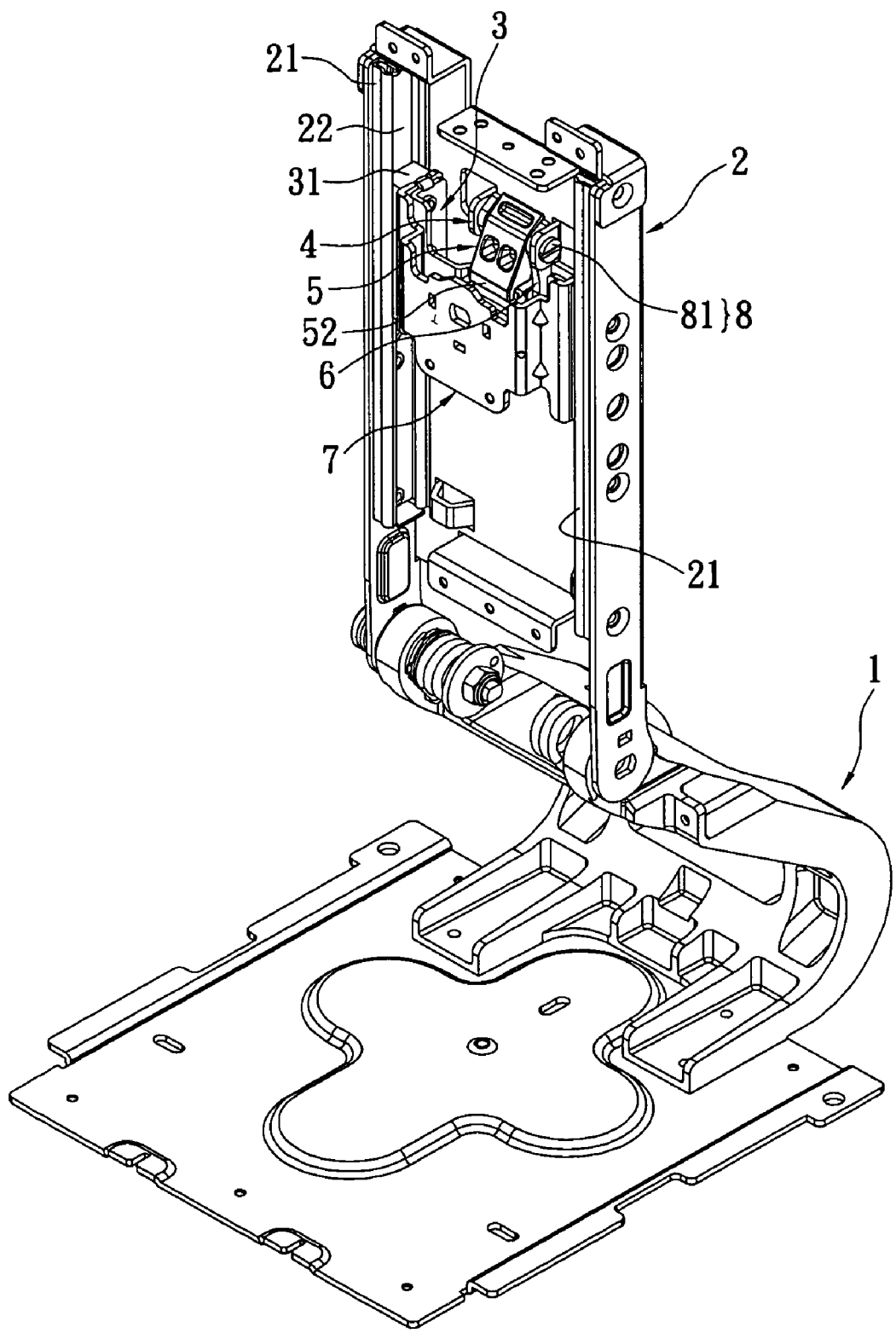
FIG. 3 is a perspective view showing the foldable supporting stand with stoppers in two directions according to the present invention.

Please refer to FIG. 3. The present invention provides a foldable supporting stand with stoppers in two directions, which includes a base 1, a support 2, a sliding body 3, a positioning means 4, a first swinging piece 5 and a second swinging piece 6. One end of the support 2 is rotatably connected to the base 1, whereby the base 1 can provide an effect of balancing and fixing the support. The sliding body 3 is slidingly disposed on the support 2, so that the user can move the sliding body 3 freely according to his/her demands. The positioning means 4 is connected in the support 2. The first swinging piece 5 and the second swinging piece 6 are swingably connected to the positioning means 4. The positioning means 4, the first swinging piece 5 and the second swinging piece 6 are located between the support 2 and the sliding body 3.

The support 2 has two bent plates 21 and two slots 22. The two bent plates 21 extend from both sides of the support 2 respectively. The two bent plates 21 form the two slots 22.

The sliding body 3 is provided with at least two sliding blocks 31. The two sliding blocks 31 are disposed on both sides of the sliding body 3. With the two sliding blocks 31 being movably inserted into the slots 22 of the support 2, the sliding body 3 can slide in two directions. Furthermore, the number of the sliding blocks 31 is not limited to a specific one. In the present embodiment, the number of the sliding block 31 is two.

Figure 4A:
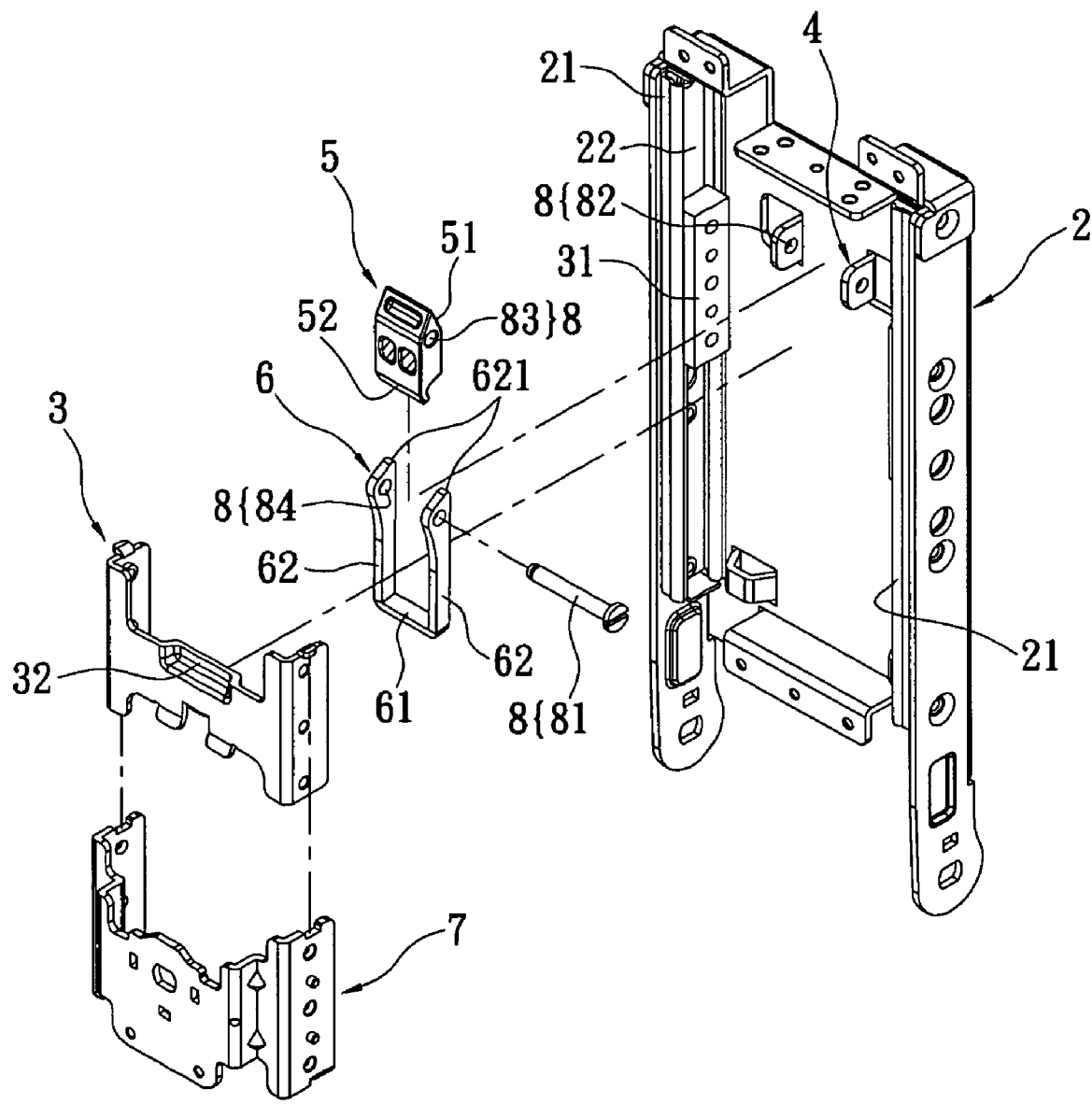
FIG. 4A is a partially exploded view showing the foldable supporting stand with stoppers in two directions according to the present invention.
Figure 4B:
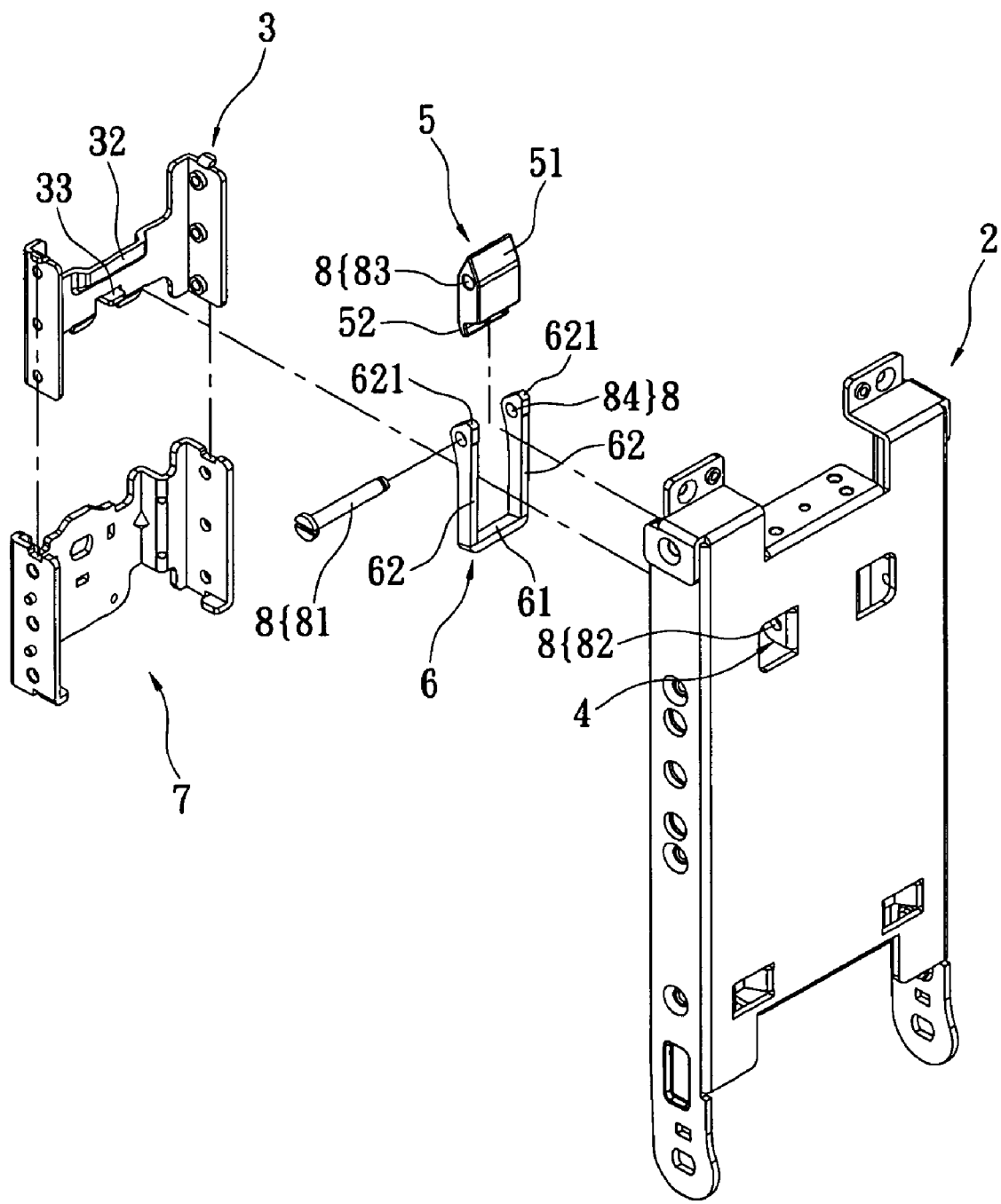
FIG. 4B is a partially exploded view viewed from another angle and showing the foldable supporting stand with stoppers in two directions according to the present invention.

Please refer to FIGS. 4A and 4B. The sliding body 3 has a first stopper 32 and a second stopper 33. More specifically, the first stopper 32 is provided on one side of the sliding body 3, and the second stopper 33 is provided on the other side of the sliding body 3. The first stopper 32 and the second stopper 33 are located on the swinging paths of the first swinging piece 5 and the second swinging piece 6, so that the first stopper 32 and the second stopper 33 can provide a locking and fixing effect to restrict the sliding body 3 from sliding in two directions. That is to say, when the first stopper 32 and the second stopper 33 of the sliding body 3 lock the first swinging piece 5 and the second swinging piece 6 respectively, since the first swinging piece 5 and the second swinging piece 6 are connected to the positioning means 4, while the positioning means 4 is connected into the support 2, the sliding body 3 is restricted by the first swinging piece 5 and the second swinging piece 6 to the positioning means 4 and thus the sliding body 3 cannot move freely in two directions. Furthermore, the first stopper 32 and the second stopper 33 of the sliding body 3 can be each a boss provided on the sliding body 3 separately or a protruding plate extending integrally with the sliding body 3. More specifically, any member that can generate a locking effect can be used as the first stopper 32 and the second stopper 33 of the sliding body 3.

Please refer to FIG. 3. In order to mount a screen (not shown) on the sliding body 3, a screen fixing piece 7 is further provided on the sliding body 3. The screen fixing piece 7 is connected between the screen (not shown) and the sliding body 3. With the screen fixing piece 7 sliding together with the sliding body 3, the screen (not shown) can be driven to move.

Please refer to FIGS. 4A and 4B. The positioning means 4 are two plates corresponding to each other. The positioning means 4 can be integrally connected with the support 2, or both the positioning means and the support can be provided separately and then connected to each other. In the present embodiment, the positioning means 4 are two plates integrally extending from the support 2 toward the sliding body 3. It should be noted that the positioning means 4 is used to determine the position to which the sliding body 3 is fixed on the support 2. Thus, the position of the positioning means 4 can be adjusted according to the user's demands. Once the position of the positioning means 4 on the support 2 is changed, the position of the sliding body 3 to which it is fixed is also changed accordingly.

A connecting means 6 is further provided among the positioning means 4, a first swinging piece 5 and the second swinging piece 6. The connecting means 8 is used to connect the positioning means 4, a first swinging piece 5 and the second swinging piece 6. More concretely, the first swinging piece 5 and the second swinging piece 6 are coaxially and swingably connected to the connecting means 8. The connecting means 8 has a rod 81, two first through-holes 82, a second through-hole 83 and a third through-hole 84. The positioning means 4 is provided with the first through-holes 82. The first swinging piece 5 is provided with the second through-hole 83, and the second swinging piece 6 is provided with the third through-hole 84. The rod 81 passes through the second through-hole 83 and the third through-hole 84 to connect the first swinging piece 5 and the second swinging piece 6. The two ends of the rod 81 are exposed to the outside. These two exposed ends of the rod 81 are fixed into the first through-holes 82 of the positioning means 4. Thus, via the above connection, the first swinging piece 5 and the second swinging piece 6 can swing by using the rod 81 as a supporting shaft.

The first swinging piece 5 is a block. The first swinging piece 5 has a restricting slope 51 and an abutting portion 52. The restricting slope 51 and the abutting portion 52 are located on both sides of the first swinging piece 5 respectively. The abutting portion 52 is used to lock the sliding body 3. In the present embodiment, the abutting portion 52 is a plate integrally extending from one side of the first swinging piece 5, thereby locking the first stopper 32 of the sliding body 3. The restricting slope 51 is provided at one end of the first swinging piece 5 with a specific angle. When the support 2 is folded, the restricting slope 51 abuts the support 2, so that the restricting slope 51 provides a supporting force for the first swinging piece 5. Further, due to its specific angle, the restricting slope 51 can restrict the swinging range of the first swinging piece 5.

The second swinging piece 6 comprises a retaining plate 61 for abutting the second stopper 33 of the sliding body 3 and connecting arms 62 extending from both sides of the retaining plate 61. Thus, the second swinging piece 6 is firmed into a U shape. The first swinging piece 5 is connected between the two connecting arms 62. More specifically, the two connecting arms 62 are provided with the third through-hole 84. Via the rod 81, the second swinging piece 6 is connected between the first swinging piece 5 and the positioning means 4. In addition, when the first swinging piece 5 and the second swinging piece 6 are swinging together, in order to allow the second swinging piece 6 to abut the sliding body 3 before the first swinging piece 5, the second swinging piece 6 is designed to be longer than the first swinging piece 5. Via this difference in the lengths of both swinging pieces, when the first swinging piece 5 and the second swinging piece 6 are swinging together, the second swinging piece 6 can abut the sliding body 3 first. Then, the first swinging piece 5 abuts the sliding body 5. In this way, two abutting actions can be generated in order.

Further, the connecting arm 62 of the second swinging piece 6 has a slope 621. The slope 621 is provided on one end of the connecting arm 62 with a specific angle. When the second swinging piece 6 is swinging, the slope 621 abuts the support 2, so that the slope 621 can provide a supporting force for the second swinging piece 6. Further, due to its specific angle, the slope 621 can restrict the swinging range of the second swinging piece 6.

Figure 5A:
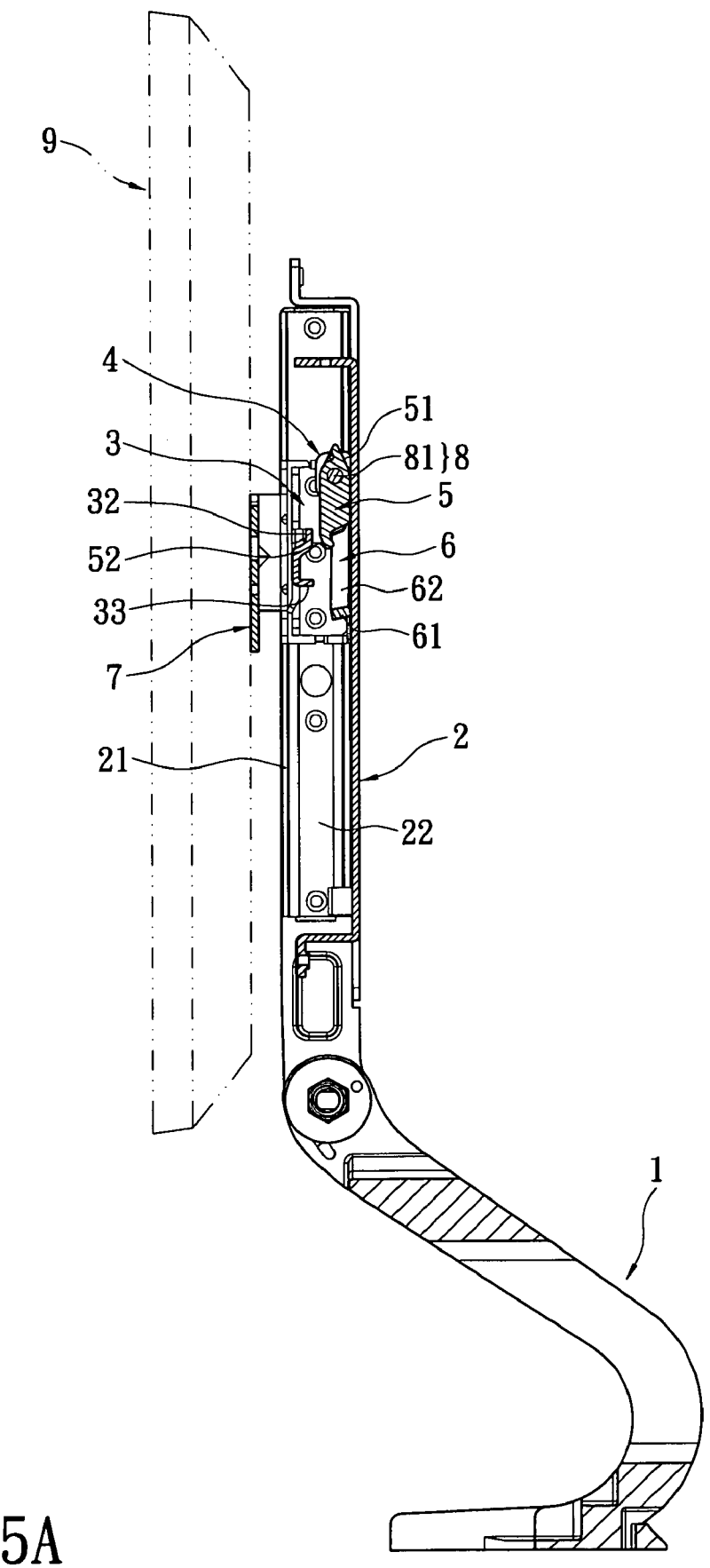
FIG. 5A is a schematic view showing an operating state of the foldable supporting stand with stoppers in two directions according to the present invention.

Please refer to FIG. 5A. When the support 2 is in an upright position, since the first swinging piece 5 and the second swing piece 6 are swingably connected to the rod 81, the first swinging piece 5 and the second swinging piece 6 hang down naturally due to their gravitational force. As a result, the abutting portion 52 of the first swinging piece 5 and the retaining plate 61 of the second swinging piece 6 cannot contact and thus lock the first stopper 32 and the second stopper 33 of the sliding body 3, so that the sliding body 3 can move on the support 2 freely in two directions (i.e. slides upwards or downwards). Since the sliding body 3 is connected to the screen fixing piece 7 and the screen fixing piece 7 is connected to a screen 9, the screen 9 can be driven to slide on the sliding body 3 in two directions.

Figure 5B:
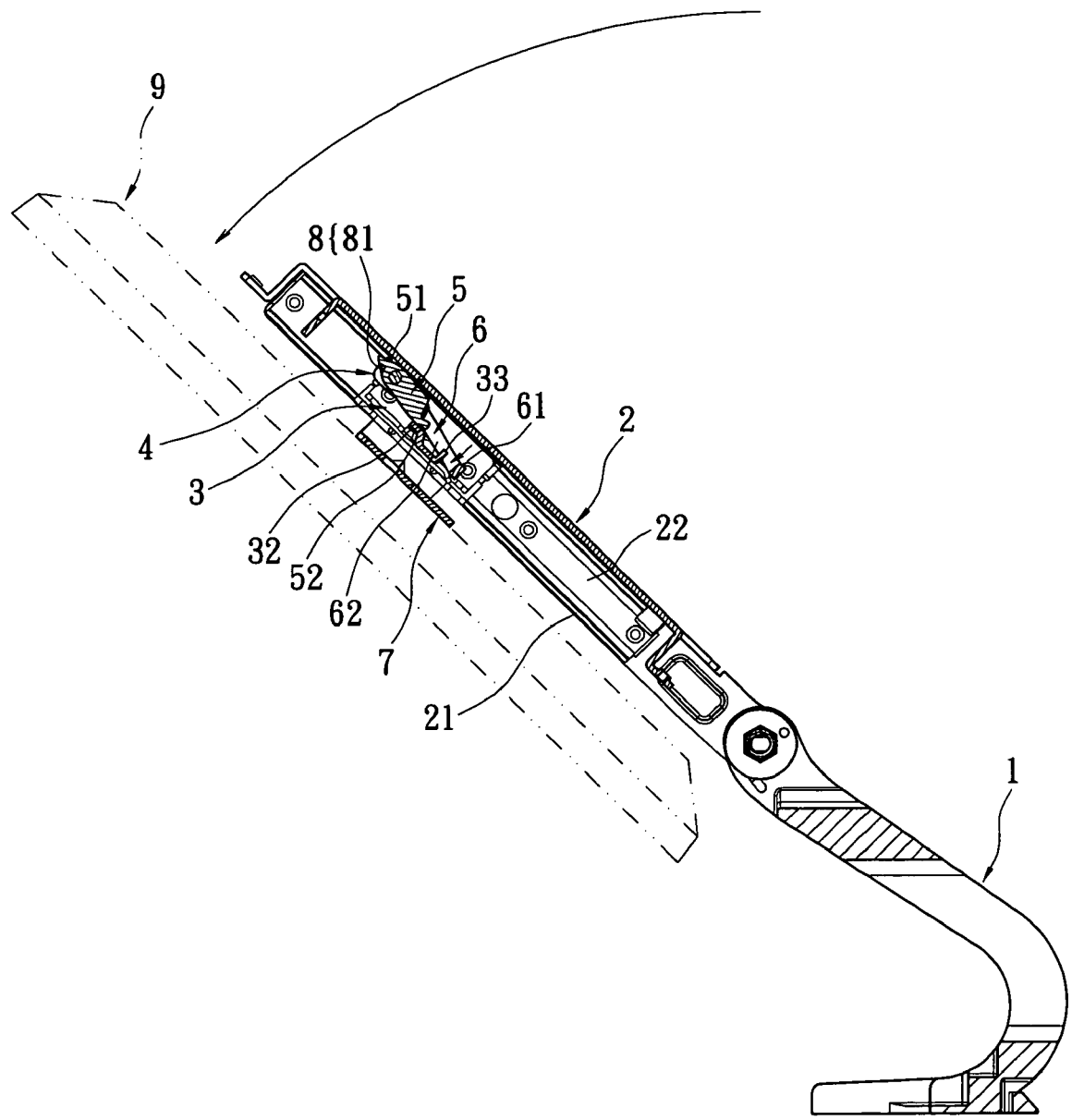
FIG. 5B is a schematic view showing another operating state of the foldable supporting stand with stoppers in two directions according to the present invention.

Please refer to FIG. 5B. When the user intends to store and package, in order to facilitate the storage or reduce the volume of storage, the user can fold the support 2 toward the base 1. At this time, the first swinging piece 5 and the second swinging piece 6 are subjected to the gravitational force to swing toward the sliding body 3. Since the second swinging piece 6 is longer than the first swinging piece 5, the second swinging piece 6 will abut the sliding body 3 completely before the first swinging piece 5.

Figure 5C:
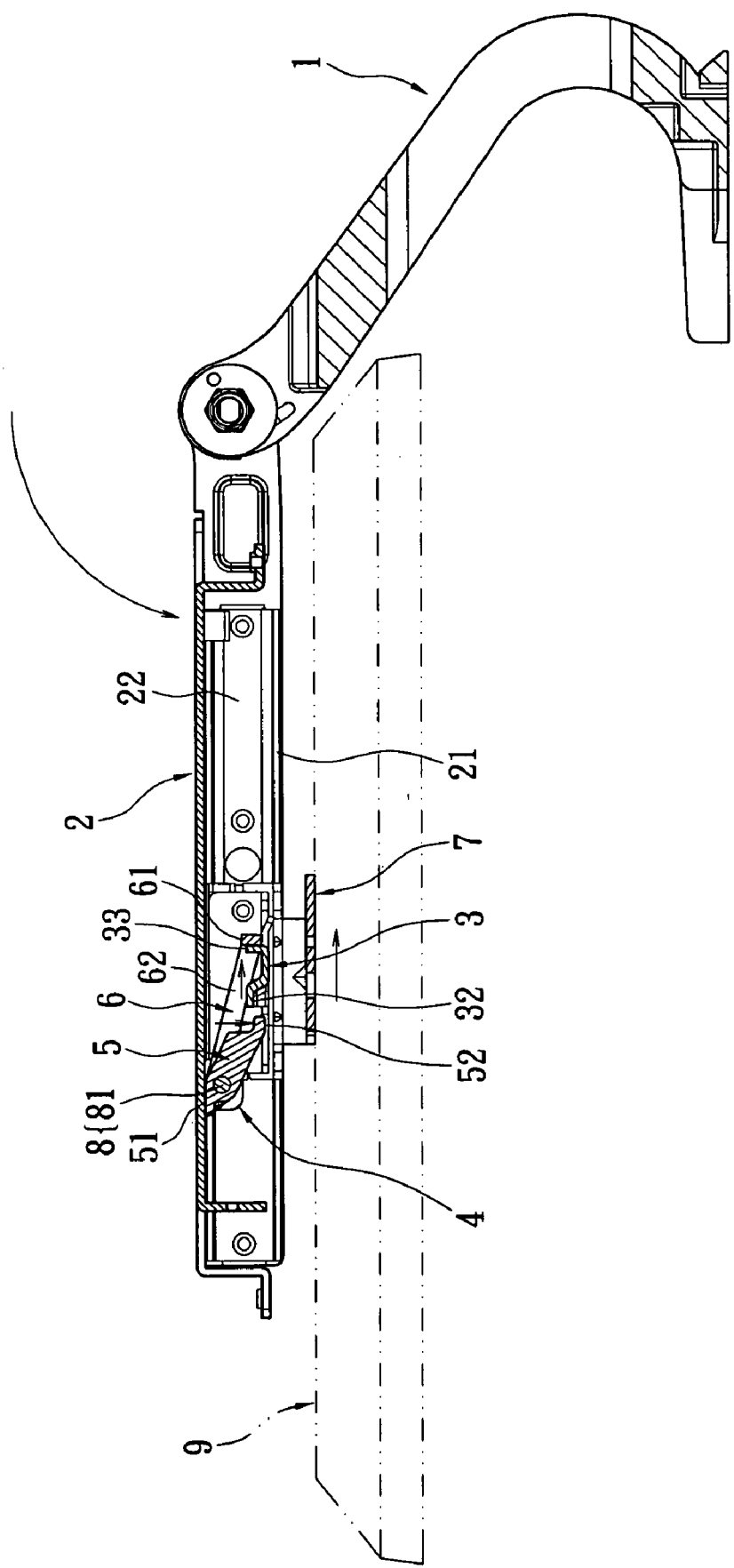
FIG. 5C is a schematic view showing a further operating state of the foldable supporting stand with stoppers in two directions according to the present invention.
Figure 5D:
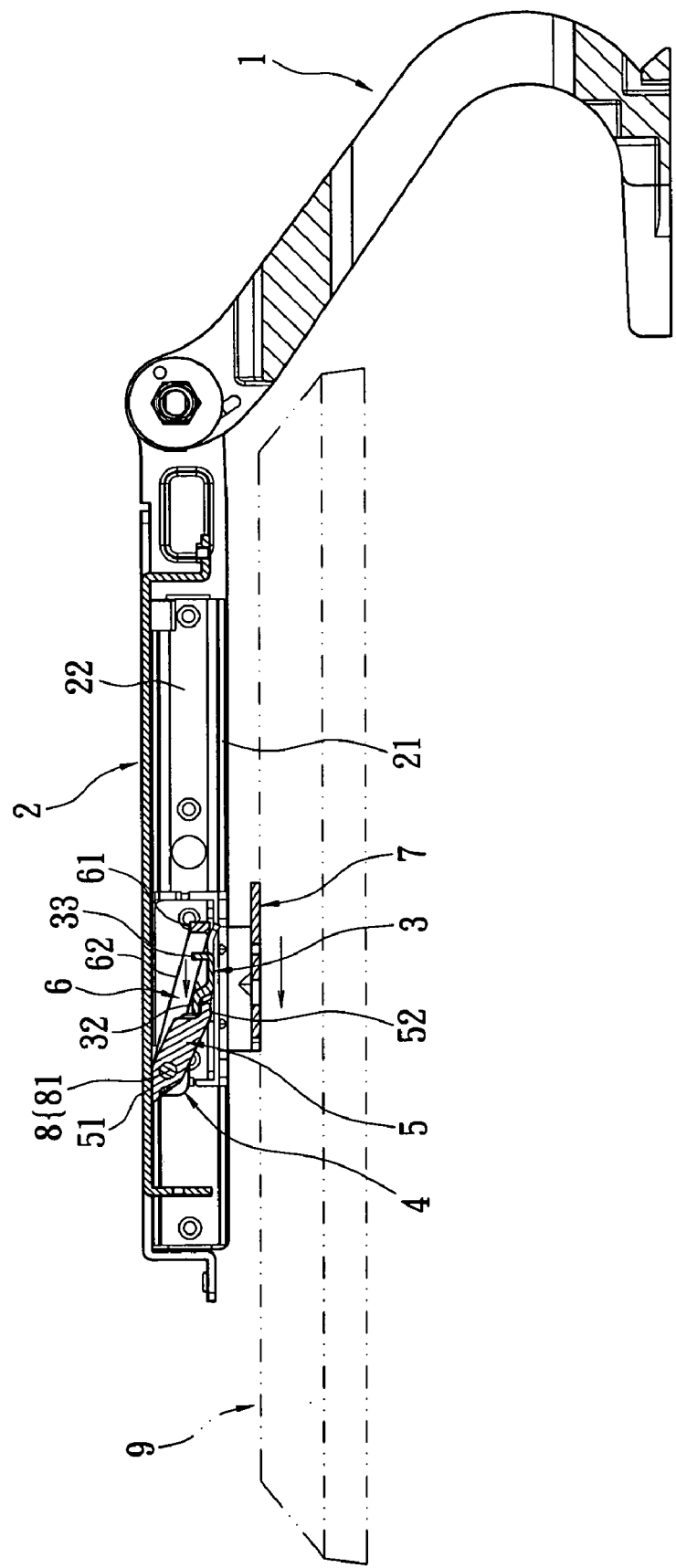
FIG. 5D is a schematic view showing still a further operating state of the foldable supporting stand with stoppers in two directions according to the present invention.

Then, the support 2 is further folded toward the base 1. Thus, the first swinging piece 5 abuts the sliding body 3 completely. At this time, the first swinging piece 5 and the second swinging piece 6 that abut the sliding body 3 completely form stopping points in two directions. After these stopping points in two directions are formed, the user only needs to move the sliding body 3 further toward the base 1. During this movement, the second stopper 33 of the sliding body 3 will push the first swinging piece 5 to depart from the sliding body 3. In this way, the first stopper 32 and the second stopper 33 of the sliding body 3 pass through the first swinging piece 5 until the second stopper 33 abuts and locks the abutting portion 52 of the second swinging piece 6. At this time, due to its gravitational force, the first swinging piece 5 swings again toward the sliding body 3 and then abuts the sliding body 3 again, so that the first stopper 32 and the second stopper 33 of the sliding body 3 are located between the first swinging piece 5 and the second piece 6 (as shown in FIGS. 5C and 5D). In this way, the first stopper 32 of the sliding body 3 abuts and locks the abutting portion 52 of the first swinging piece 5, while the second stopper 33 of the sliding body 3 abuts the abutting portion 52 of the second swinging piece 6, thereby restricting the sliding body 3 completely. That is, the sliding body 3 will be restricted completely between the first swinging piece 5 and the second swinging piece 6, so that the sliding body 3 cannot move in two directions. Therefore, when the foldable supporting stand with stoppers in two directions according to the present invention is stored and packaged, the sliding body 3 can be fixed rapidly, so that it cannot move in two directions. As a result, the screen 9 connected on the screen fixing piece 7 can be also fixed. In this way, the screen 9 can be prevented from being hit to get damaged in transportation.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A foldable supporting stand with stoppers in two directions, comprising:
   a base;
   a support rotatably connected to the base;
   a sliding body slidingly disposed on the support, one side of the sliding body being provided with a first stopper and the other side thereof being provided with a second stopper;
   a positioning means located between the sliding body and the support, the positioning means being connected in the support;
   a first swinging piece swingably connected to the positioning means; and
   a second swinging piece swingably connected to the positioning means, the second swinging piece being longer than the first swinging piece,
   wherein when the support is folded toward the base, the first swinging piece and the second swinging piece together swing from the positioning means toward the sliding body; the longer second swinging piece firstly abuts the sliding body and locks the second stopper, and the first swinging piece subsequently abuts the sliding body and locks the first stopper, thereby restricting the sliding body from sliding in two directions.

2. The foldable supporting stand with stoppers in two directions according to claim 1, wherein both sides of the support extend to form a bent plate respectively, the bent plates each forming a slot.

3. The foldable supporting stand with stoppers in two directions according to claim 2, wherein both sides of the sliding body are provided with a plurality of blocks that are slidably inserted into the slots.

4. The foldable supporting stand with stoppers in two directions according to claim 1, further comprising a screen fixing piece, the screen fixing piece being connected to the sliding body to be movable with the sliding body.

5. The foldable supporting stand with stoppers in two directions according to claim 1, wherein the positioning means are two plates extending integrally from the support toward the sliding body and corresponding to each other.

6. The foldable supporting stand with stoppers in two directions according to claim 5, wherein a connecting means is provided between the two plates, the connecting means is connected to the positioning means, the first swinging piece and the second swinging piece, the first swinging piece and the second swinging piece are coaxially and swingably connected to the connecting means.

7. The foldable supporting stand with stoppers in two directions according to claim 6, wherein the connecting means comprises a rod, two first through-holes, a second through-hole and a third through-hole, the second through-hole is provided in the first swinging piece, the third through-hole is provided in the second swinging piece, the two first through-holes are provided in the two plates, the rod passes through the second through-hole and the third through-hole to be connected to the first swinging piece and the second swinging piece, both ends of the rod are exposed to the outside, the two exposed ends of the rod are fixed into the two first through-holes, so that the first swinging piece and second swinging piece are swingably connected to the positioning means.

8. The foldable supporting stand with stoppers in two directions according to claim 1, wherein the first swing piece has a restricting slope and an abutting portion, the restricting slope is provided on one side of the first swinging piece with a specific angle, the abutting portion is located on the other side of the first swinging piece, the abutting portion selectively locks the first stopper to restrict the sliding body from sliding, the restricting slope selectively abuts the support and restricts the swinging range of the first swinging piece based on the specific angle.

9. The foldable supporting stand with stoppers in two directions according to claim 8, wherein the second swinging piece comprises a retaining plate and two connecting arms, both sides of the retaining plate extend to form the connecting arms, the first swinging piece is connected between the connecting arms, the connecting arm has a slope, the slope is provided on one end of the connecting arm with a specific angle, the slope selectively abuts the support and restricts the swinging range of the second swinging piece.

* * * * *